Sept. 29, 1931. C. F. VAN HOOK 1,825,218
CABLE REEL STAND
Filed Feb. 26, 1930 4 Sheets-Sheet 1
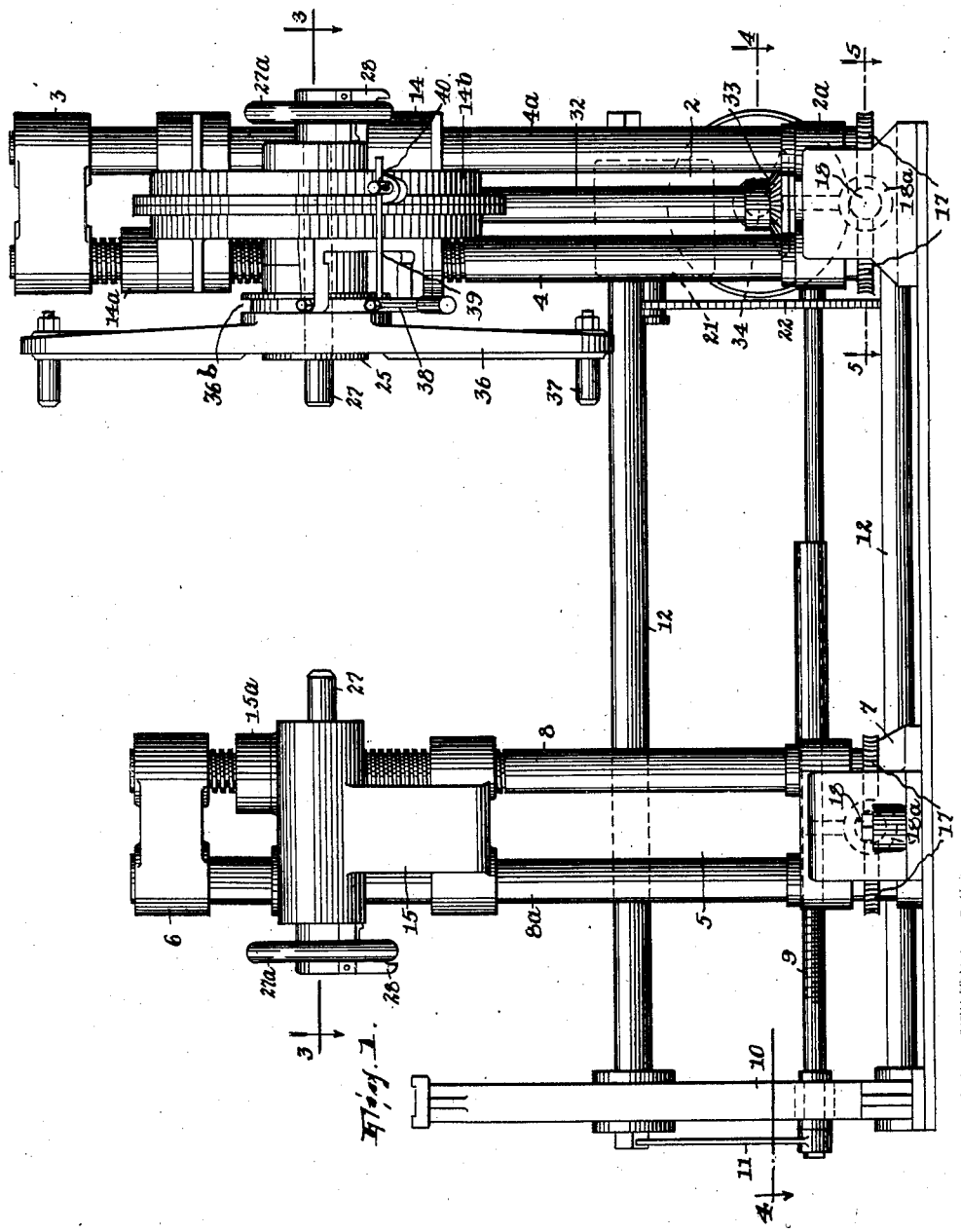

Sept. 29, 1931.　　　C. F. VAN HOOK　　　1,825,218
CABLE REEL STAND
Filed Feb. 26, 1930　　　4 Sheets-Sheet 2
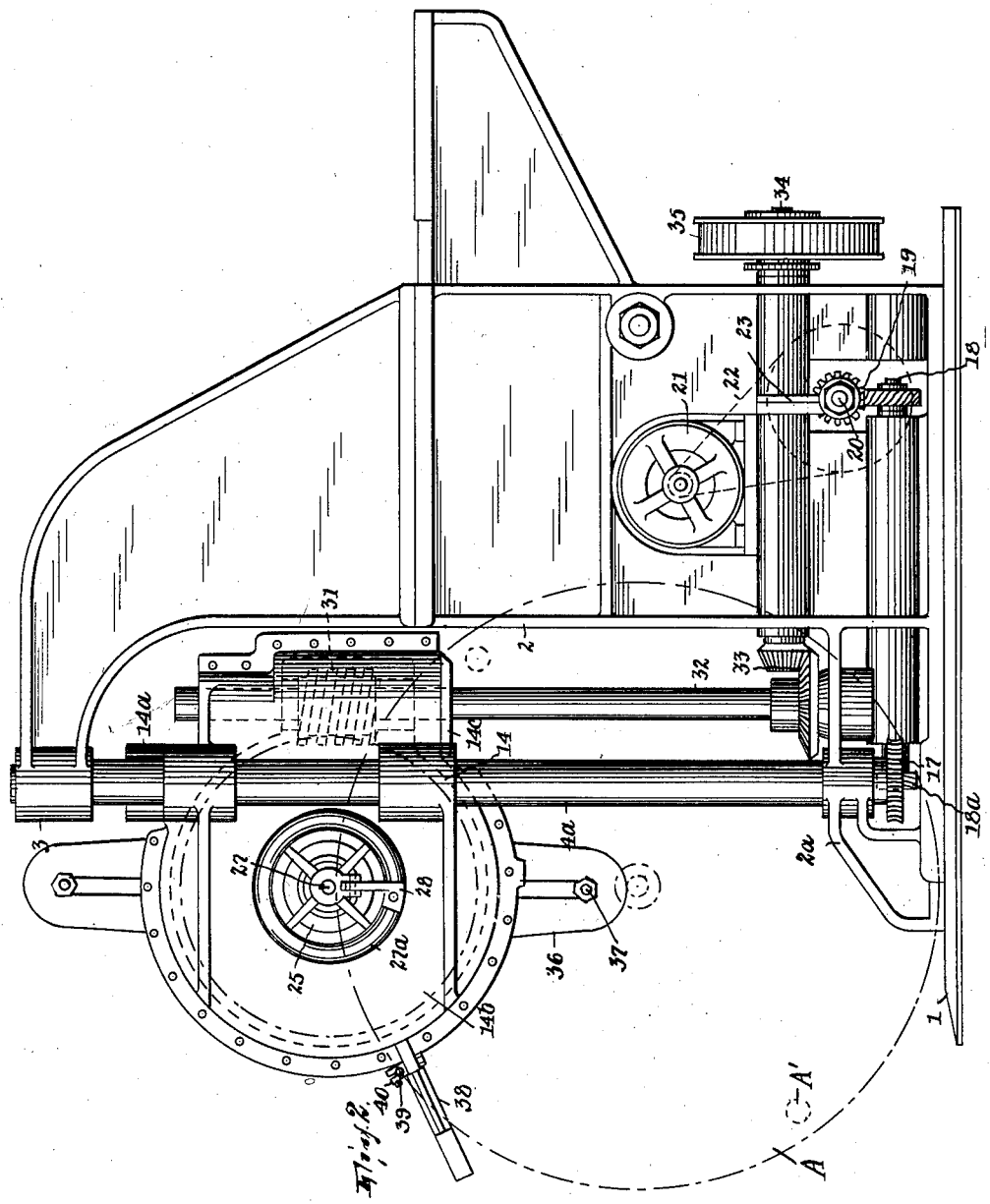
INVENTOR,
Charles F. Van Hook,
BY
ATTORNEY.

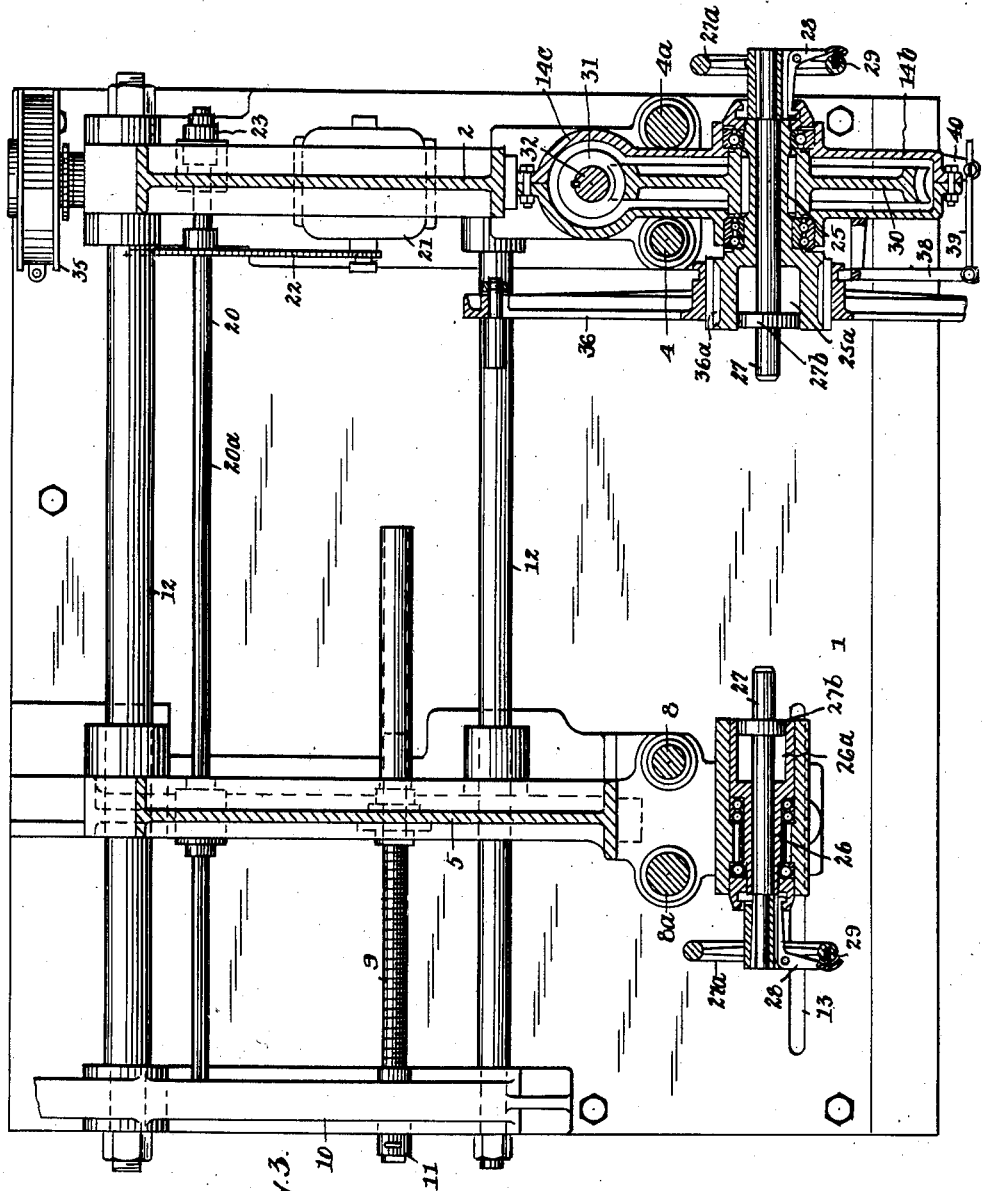

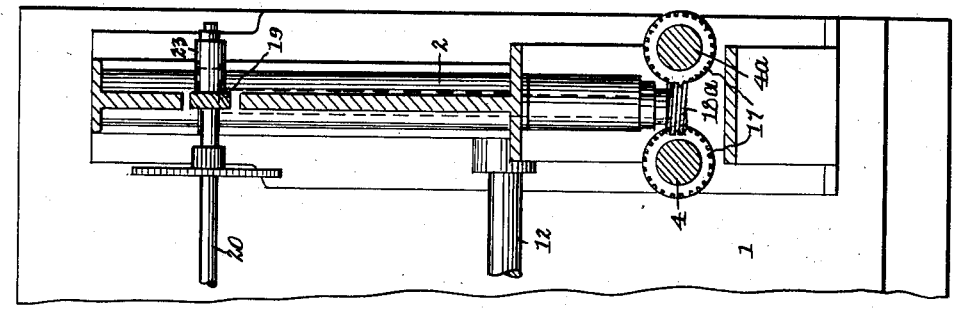
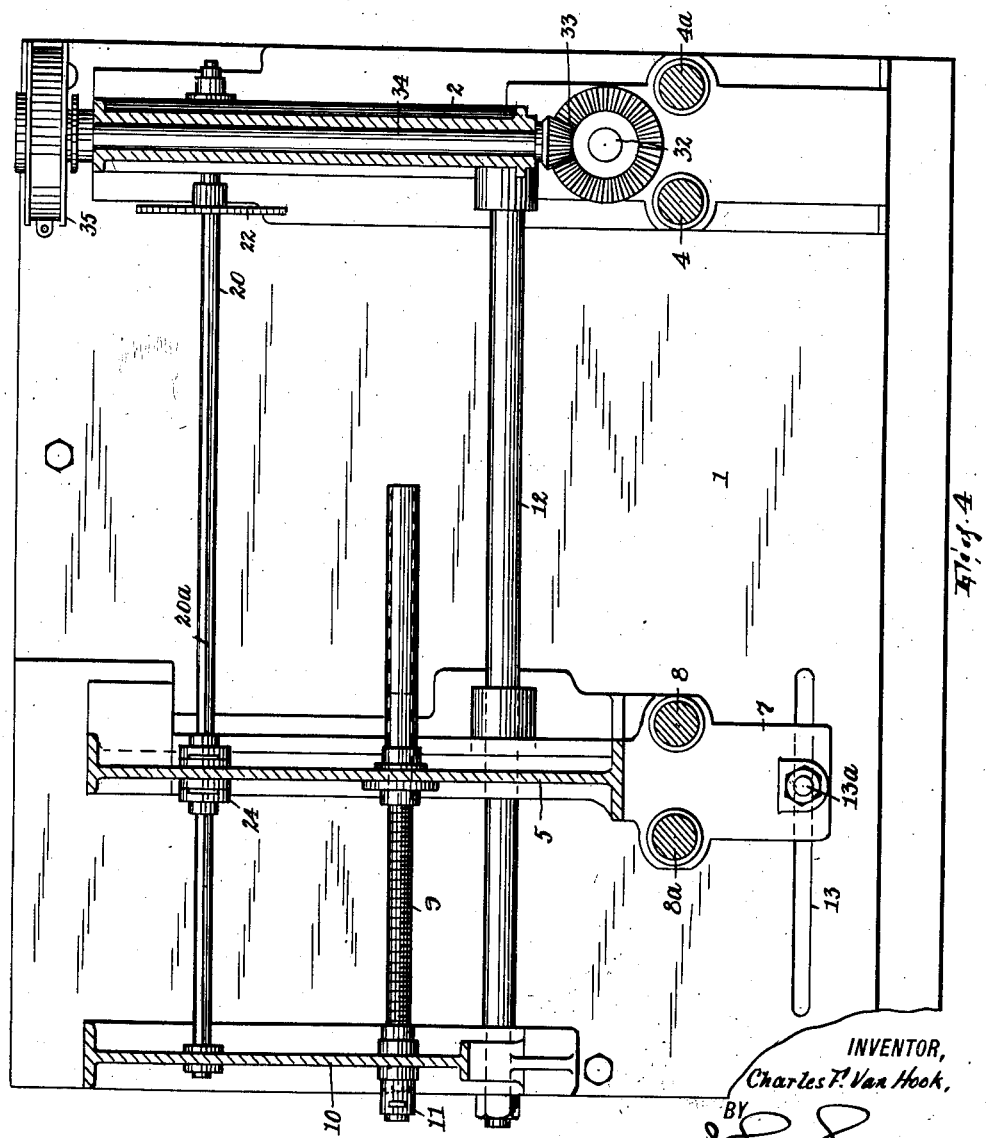

Patented Sept. 29, 1931

1,825,218

UNITED STATES PATENT OFFICE

CHARLES F. VAN HOOK, OF PATERSON, NEW JERSEY, ASSIGNOR TO WATSON MACHINE COMPANY, OF PATERSON, NEW JERSEY, A CORPORATION OF NEW JERSEY

CABLE REEL STAND

Application filed February 26, 1930. Serial No. 431,379.

This invention relates to apparatus by which large spools or reels, such as those on which heavy cables are wound, are lifted so as to be axially supported and then rotated in order to wind thereon the cable as, for instance, while it is being delivered by some machine concerned in the fabricating or other treatment of the cable. Heretofore the introduction of the spool or reel into the machine and its removal therefrom has involved the difficult labor of placing a shaft through its bore to serve as its axial support during rotation. According to this invention this operation, since the shaft is frequently in itself ponderous and usually is equipped with a gear or other driving member, is made unnecessary, and instead are used opposed horizontal spindles which, after the reel has been rolled into place between them, are entered into its bore so as to serve to lift it when they themselves are elevated. One of these spindles is in the example herein set forth contained in means whereby to rotate the spool or reel after it is lifted, which means includes a dog shiftable into and out of clutching engagement with the spool. In order to accommodate spools or reels of different widths and also of different diameters the machine comprises two uprights, one of which is adjustable horizontally toward and from the other, and also two heads containing the spindles and one also containing said dog and which are guided up and down by said uprights, together with means for shifting said heads in an up and down direction. I aim also at simplicity of construction with ample strength to withstand heavy loads and the avoidance of unnecessary frictional resistance especially in the lifting action, for which purposes preferably the guiding portion of each upright comprises a vertical guide shaft which is adapted to be rotated together with another shaft having a screw to effect the movement up or down of the corresponding head; and the means for rotating the dog remains in gear during the vertical adjustment of the corresponding head.

In the drawings,

Fig. 1 is a front elevation of the apparatus;

Fig. 2 is a right side elevation thereof; and

Figs. 3, 4 and 5 are respectively sections on lines 3—3, 4—4 and 5—5, Fig. 1.

On a base 1 is a fixed standard 2 formed with an overhang 3 in which and a pedestal 2a are journaled a pair of spaced vertical shafts 4—4a, the latter of which is a guide shaft. Adjustable on the base toward and from the upright formed by said standard and shaft 4a is another standard 5 formed with an overhang 6 in which and the pedestal 7 of this standard are journaled a pair of shafts 8—8a, shaft 8a forming a guide shaft and said standard and this shaft forming another upright. The latter upright is adjustable toward and from the first one by turning a screw 9 swivelled in a stand 10 upstanding from the base and having a screw-connection with standard 5, 11 being a wrench (operative in any way, not shown) for turning the screw in either direction. 12 designates shafts penetrating standard 5 and bracing standard 2 and stand 10. 13 is a slot in the base engaged by a stud 13a in pedestal 7 and coacting with shafts 12 to guide the second upright during adjustment thereof.

On shafts 4—4a and 8—8a and in contact with the vertical front faces of the standards 2 and 5 are arranged to slide vertically the spool-supporting heads 14 and 15, for which purpose the shafts 4 and 8 are threaded as shown and the heads have nuts 14a—15a engaged with the threading or screw portions of these shafts. For raising and lowering the heads there is the following mechanism: On the lower ends of each pair of shafts 4—4a and 8—8a are wormwheels 17 both in mesh with a worm 18a on a front-to-rear extending shaft 18 journaled in each upright 2 and 5 and these two shafts 18 are adapted to be rotated by spiral gearing 19 connecting each of them with a transverse shaft 20 rotated from a reversible motor 21 through a sprocket-and-chain drive 22; shaft 18 may be held against thrustwise movement in its bearing 23 (Fig. 5) in upright 2, but in view of the adjustability of standard 5 toward and from standard 2 the member of said spiral gearing which appertains to standard 5 is connected with the shaft by a spline 20a (Fig. 4) and said member is made to slide on the shaft on adjustment of said standard by being contained in a housing 24 thereof. (The guide shafts 4a—8a are rotated to reduce the static friction between them and the heads where they penetrate the latter.)

A headstock bushing 25 and a tailstock bushing 26 are journaled in heads 14—15, respectively, they having axial lifting spindles 27 alined with each other and each movable from a position where it is substantially sheathed by the bushing containing it toward the other so as to protrude; it may be locked in the latter position by a pawl 28 pivoted in the wheel-like handle 27a thereof and adapted to be held by a spring 29 engaged with an internal circumferential groove in the bushing. To reinforce the spindle against bending under heavy loads its inner end portion has a collar 27b which has a bearing in an enlargement 25a—26a of the bushing bore in which the spindle is received.

The part of the head 14 in which the bushing 25 is journaled forms an annular housing 14b and this contains a wormwheel 30 of which the bushing forms in effect the hub. This worm-wheel meshes with a worm 31 which is contained in a housing 14c of the head 14 so as to move vertically therewith and with relation to the shaft 32 on which said worm is splined, which shaft has fixed bearings in a pedestal 2a of the standard 2. This shaft is driven through bevel gearing 33 from a front-to-rear extending shaft 34 journaled in upright 2 and having a driving member 35 which by a belt or otherwise is in turn driven from the machine which serves the present machine or with which it is otherwise associated.

On the bushing 25 and rotatable therewith but splined thereto at 36a is a two-armed dog 36 having studs 37 to engage the diametrically opposite holes A' in one end of the spool A. By means of a fork 38 engaged in a circumferential groove 36b of the dog and fulcrumed in the head 14 this dog may be shifted so as to clutch it with or clear it from the spool, 39 being a rod pivoted thereto and received in a clamp 40 which when tightened holds the dog at either limit of its shifting motion.

Operation: The spool or reel A to be elevated and rotated is first rolled in between the heads, having previously adjusted the left-hand upright to the proper spacing from the other upright, and, the heads having been adjusted up or down by operating the motor 21 and the spool so set that its bore is axially alined with the spindles, the latter are shifted toward each other and so engaged in the spool bore. Thereupon the heads are adjusted or moved up by operating the motor to clear the spool from the floor. When this has been done the spool may be turned on the spindles by hand to bring its clutching holes A' in register with the studs 37 on the dog, which is itself not free to be rotated manually because it remains always in gear with the system of which 35, carried by a part (2) of the fixed supporting means, is the prime mover. The operation of winding may now proceed; this, as indicated, is effected by rotating pulley 35, which, if the present apparatus is used with some machine for fabricating or treating the cable, will be driven therefrom. In usual practice there will be two heads with their described spool carrying and rotating means. But I do not wish to be limited to the presence of both.

With respect to each head, the load represented by the spool is offset or lateral thereof, wherefore to give the necessary strength and ease the up and down motion of the head as much as possible two shafts (the screw shaft and guide shaft) are employed; they are arranged so as to be offset one with relation to the other in the same lateral direction as the spool and head stand offset one with relation to the other; the head slides in contact with the front vertical face of the standard (2 or 5); and the guide shaft as well as the screw shaft is rotated.

Having thus fully described my invention what I claim is:

1. In combination, a supporting means, a head adjustable therein up or down, and a spool carrying and rotating means arranged in the head and including a substantially horizontal spindle having a free end and movable back and forth to enter said end in or clear it from the bore of a spool placed substantially coaxial therewith and a revoluble dog concentric with the spindle and shiftable back and forth lengthwise thereof into and out of clutching engagement with the spool, said spindle and dog being each adapted to occupy its spool-engaging position when the other is clear of the spool.

2. In combination, a supporting means, a head adjustable therein up or down, a spool rotating means arranged in the head and including a dog revoluble on a substantially horizontal axis and shiftable back and forth into and out of clutching engagement with a spool placed opposite thereto, and a spindle arranged in and substantially coaxial with respect to said rotating means and having a free end and movable lengthwise back and forth to enter said end in or clear it from the bore of said spool, said spindle and dog being each adapted to occupy its spool-engaging position when the other is clear of the spool.

3. In combination, a supporting means, a head adjustable therein up or down, a bushing revoluble in the head on a substantially horizontal axis, a dog revoluble with and shiftable back and forth lengthwise of said axis on the bushing into and out of clutching engagement with a spool placed opposite thereto, and a spindle arranged in and substantially coaxial with said bushing and movable lengthwise back and forth to enter or clear it from the bore of the spool, said spindle and dog being each adapted to occupy its spool-engaging position when the other is clear of the spool.

4. In combination, a supporting means, a head adjustable therein up or down, spool carrying and rotating means arranged in the head on a substantially horizontal axis, a member from which to rotate the second means revoluble in said supporting means on an upright axis, and a rotation-imparting member intergeared with the second means and carried by the head and splined to the first member.

5. In combination, supporting means, a head adjustable up or down therein, a rotation-imparting dog revoluble on a substantially horizontal axis in the head and having means to rotate a spool positioned approximately coaxial therewith, a rotary driving member in the supporting means, means operative to transmit rotation from said member to said dog at any elevation of the head, and a lifting spindle coaxial with the dog and having a free end to be received in the bore of the spool.

6. In combination, a head, means thereon to support a revoluble spool, an upright including a revoluble guide shaft on which said head is movable up or down, a revoluble screw shaft coacting with the guide shaft to guide and vertically position the head, said screw and guide shaft being parallel to each other, and means to rotate said shafts in unison.

7. In combination, a pair of spaced uprights, a pair of opposed heads guided thereby for movement up or down, means to elevate the heads in substantial unison, spool carrying and rotating means arranged in one head and including a substantially horizontal spindle having a free end projecting toward and being movable toward and from the other head to enter said end into and clear it from the bore of a spool interposed between the heads and a dog revoluble in concentric relation to said spindle and shiftable toward and from said other head into and out of clutching engagement with the spool, said spindle and dog being each adapted to occupy its spool-engaging position when the other is clear of the spool, and another substantially horizontal spindle arranged in the other head substantially opposite the first spindle and having a free end projecting toward and being movable toward and from the first head to enter its said end into and clear it from said spool bore.

8. In combination, a pair of spaced uprights, a pair of opposed heads guided thereby for movement up or down, means to elevate the heads in substantial unison, spool carrying and rotating means arranged in one head and including a substantially horizontal spindle having a free end projecting toward and being movable toward and from the other head to enter said end into and clear it from the bore of a spool interposed between the heads and a dog revoluble in concentric relation to said spindle and shiftable, independently thereof, toward and from said other head into and out of clutching engagement with the spool, and another substantially horizontal spindle arranged in the other head substantially opposite the first spindle and having a free end projecting toward and being movable toward and from the first head to enter its said end into and clear it from said spool bore.

9. In combination, a supporting means, a head adjustable therein up or down, and a spool carrying and rotating means arranged in the head and including a substantially horizontal spindle having a free end and movable back and forth to enter said end in or clear it from the bore of a spool placed substantially coaxial therewith and a revoluble dog concentric with the spindle and shiftable back and forth lengthwise thereof into and out of clutching engagement with the spool.

In testimony whereof I affix my signature.

CHARLES F. VAN HOOK.